United States Patent
Munshi et al.

(10) Patent No.: US 7,791,602 B2
(45) Date of Patent: *Sep. 7, 2010

(54) METHOD AND APPARATUS FOR IMPLEMENTING LEVEL OF DETAIL WITH RAY TRACING

(76) Inventors: Aaftab A. Munshi, 17300 Laurel Rd., Los Gatos, CA (US) 95033; Mark Wood-Patrick, 3014 Malton Ct., San Jose, CA (US) 95148

(*) Notice: Subject to any disclaimer, the term of this patent is extended or adjusted under 35 U.S.C. 154(b) by 9 days.

This patent is subject to a terminal disclaimer.

(21) Appl. No.: 11/464,435

(22) Filed: Aug. 14, 2006

(65) Prior Publication Data

US 2006/0290696 A1    Dec. 28, 2006

Related U.S. Application Data

(63) Continuation of application No. 10/681,829, filed on Oct. 7, 2003, now Pat. No. 7,126,605, which is a continuation of application No. 09/898,034, filed on Jul. 3, 2001, now abandoned.

(51) Int. Cl.
*G06T 17/00* (2006.01)
(52) U.S. Cl. .................. 345/428; 345/419; 345/426; 345/427; 345/440; 345/582; 345/583; 345/584; 345/441; 345/589
(58) Field of Classification Search ............ 345/419, 345/426, 427, 428, 440, 582, 583, 584, 441, 345/589, 597
See application file for complete search history.

(56) References Cited

U.S. PATENT DOCUMENTS

| | | | |
|---|---|---|---|
| 5,831,620 A | 11/1998 | Kuchury, Jr. | |
| 6,028,608 A | 2/2000 | Jenkins | |
| 6,091,422 A | 7/2000 | Ouaknine | |
| 6,300,956 B1 | 10/2001 | Apodaca et al. | |
| 6,400,372 B1 | 6/2002 | Gossweiler, III | |
| 6,597,359 B1 | 7/2003 | Lathrop | |

(Continued)

OTHER PUBLICATIONS

Alias/Wavefront, "Maya API White Paper," 1999, p. 1-9.

(Continued)

*Primary Examiner*—Kimbinh T Nguyen
(74) *Attorney, Agent, or Firm*—McDonnell Boehnen Hulbert & Berghoff LLP

(57) ABSTRACT

The present invention relates to computer graphics applications involving scene rendering using objects modeled at multiple levels of detail. In accordance with an aspect of the invention, a ray tracer implementation allows users to specify multiple versions of a particular object, categorized by LOD ID's. A scene server selects the version appropriate for the particular scene, based on the size of the object on the screen for example, and provides a smooth transition between multiple versions of an object model. In one example, the scene server will select two LOD representations associated with a given object and assign relative weights to each representation. The LOD weights are specified to indicate how to blend these representations together. A ray tracer computes the objects hit by camera rays associated with pixels in the camera window, as well as secondary rays in recursive implementations, and rays striking LOD objects are detected and shaded in accordance with the weights assigned to the different representations. Embodiments are disclosed for level of detail control using both forward ray tracing and backward ray tracing, including handling of camera rays, reflected rays, refracted rays and shadow rays.

36 Claims, 7 Drawing Sheets

U.S. PATENT DOCUMENTS

| | | | |
|---|---|---|---|
| 6,674,430 B1 * | 1/2004 | Kaufman et al. | 345/419 |
| 7,133,041 B2 * | 11/2006 | Kaufman et al. | 345/419 |
| 7,471,291 B2 * | 12/2008 | Kaufman et al. | 345/424 |
| 2004/0125103 A1 | 7/2004 | Kaufman | |

OTHER PUBLICATIONS

Avid Technology, Inc., "Softimage 3D, Version 3.9.2," 2000 (3 pages).

Cinema Graphics, Inc., "Displacement Shaders," ShadeTree—RenderMan Tutorial, 1998, pp. 1-3 (Retrieved from the World Wide Web on Apr. 13, 2001 at http://www.cinegrfx.com/newpages/prman-tutorial/prman_displacement_shaders.html).

Cinema Graphic, Inc., "Light Shaders," ShadeTree—RenderMan Tutorial, 1998, pp. 1-2 (Retrieved from the World Wide Web on Apr. 13, 2001 at http://www.cinegrfx.com/newpages/prman-tutorial/prman_light_shaders.html).

Cinema Graphic, Inc., "Surface Shaders," ShadeTree—RenderMan Tutorial, 1998, pp. 1-2 (Retrieved from the World Wide Web on Apr. 13, 2001 at http://www.cinegrfx.com/newpages/prman-tutorial/prman_surface_shaders.html).

Discreet Logic Inc., "3ds max: Unleash Your Maximum Creativity, Release 4" (2000) (4 pages).

* cited by examiner

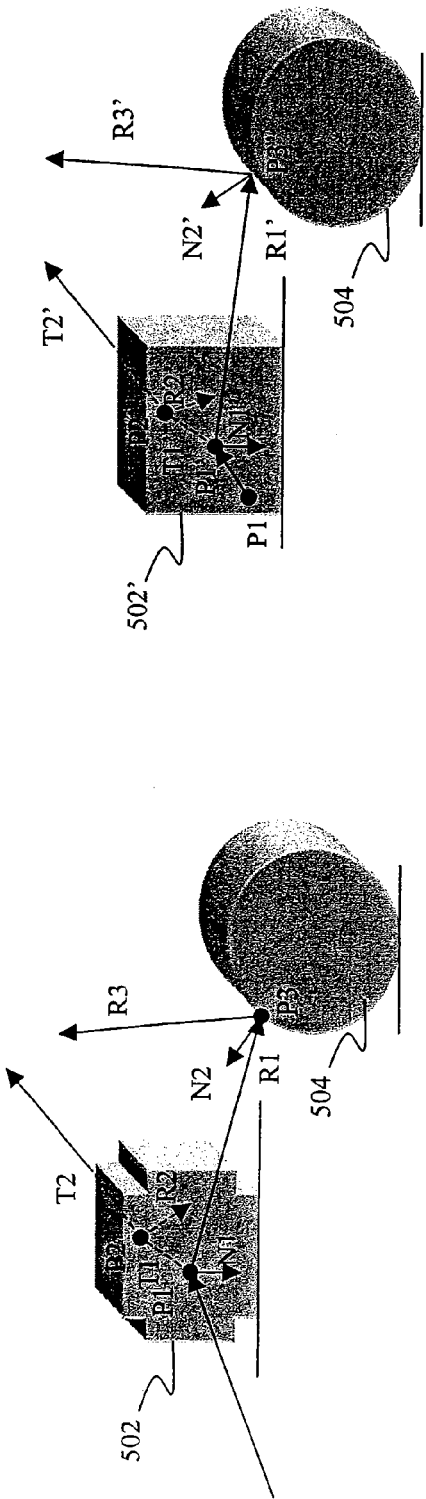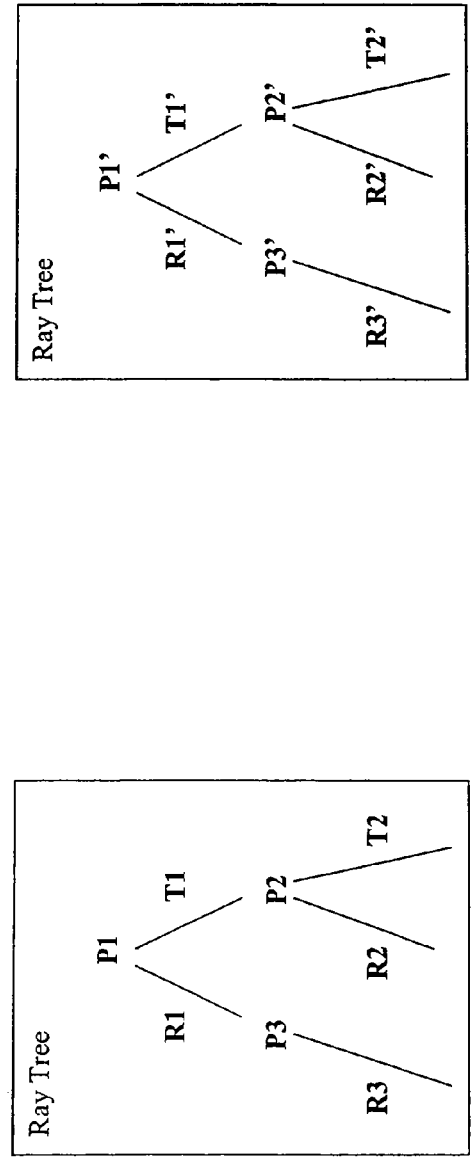
FIG. 5B
FIG. 5A

METHOD AND APPARATUS FOR IMPLEMENTING LEVEL OF DETAIL WITH RAY TRACING

CROSS-REFERENCE TO RELATED APPLICATIONS

This application is a continuation of U.S. application Ser. No. 10/68 1,829 filed on Oct. 7, 2003 and issued as U.S. Pat No. 7,126,605 on Oct. 24, 2006, which was a continuation of U.S. application Ser. No. 09/898,034 filed on Jul. 3, 2001 and now abandoned.

FIELD OF THE INVENTION

The present invention relates generally to computer graphics, and more particularly, to rendering of scenes with objects having multiple levels of detail using techniques such as ray tracing.

BACKGROUND OF THE INVENTION

Object modeling and rendering are performed in many computer graphics applications such as CAD/CAM, computer animation and gaming, visualization systems, flight simulators, special effects, medical imaging, architectural visualization, virtual reality, etc.

In some applications, multiple level of detail (LOD) models of objects (typically 3-dimensional, but can be 2-dimensional) can be specified to satisfy various shot requirements. FIG. 1A illustrates a relatively un-detailed model 102 consisting of relatively few geometric primitives (e.g. polygons or triangles 106) while FIG. 1B illustrates a very detailed model 104 of the same object consisting of relatively many geometric primitives. The selection of which model 102, 104 to use in a shot can be based on, for example, the distance of the object in the scene from the viewer. Accordingly, as shown in FIG. 1C, when the object is relatively distant from the viewer and/or appears very small in the scene, un-detailed model 102 may be used, whereas when the object is relatively close up and/or occupies a large portion of the scene, detailed model 104 may be used. Since many copies of a model can be used in a scene, using level of detail can reduce memory requirements and the time it takes to render the scene.

As is known, rendering a scene including stored object models involves determining which objects are visible, i.e., the surfaces of objects that are not hidden from view by other objects. As should be apparent from above, whenever a scene includes an object having multiple LODs is encountered, the appropriate LOD needs to be determined. However, a problem arises in that different LODs may affect the visibility of various overlapping objects. Further, for certain types of object visibility determinations such as ray tracing, additional problems are encountered that have not been addressed in the prior art, such as how to account for child rays (e.g. shadow, refracted and reflected rays) spawned from an object having different LODs.

SUMMARY OF THE INVENTION

The present invention relates to computer graphics applications involving scene rendering using objects modeled at multiple levels of detail. In accordance with an aspect of the invention, a ray tracer implementation allows users to specify multiple versions of a particular object, categorized by LOD ID's. A scene server selects the version appropriate for the particular scene, based on the perceived size of the object on the screen for example, and provides a smooth transition between multiple versions of an object model. In one example, the scene server will select two LOD representations associated with a given object and assign relative weights to each representation. The LOD weights are specified to indicate how to blend these representations together. A ray tracer computes the objects hit by camera rays associated with pixels in the camera window, as well as secondary rays in recursive implementations, and rays striking LOD objects are detected and shaded in accordance with the weights assigned to the different representations. Embodiments are disclosed for level of detail control using both forward ray tracing and backward ray tracing, including handling of camera rays, reflected rays, refracted rays and shadow rays.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIGS. 5A and 5B illustrate an example of recursive ray tracing performed in accordance with another embodiment of the present invention;

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, those skilled in the art will recognize that various components can be implemented using various combinations of hardware, software and/or firmware, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1A:
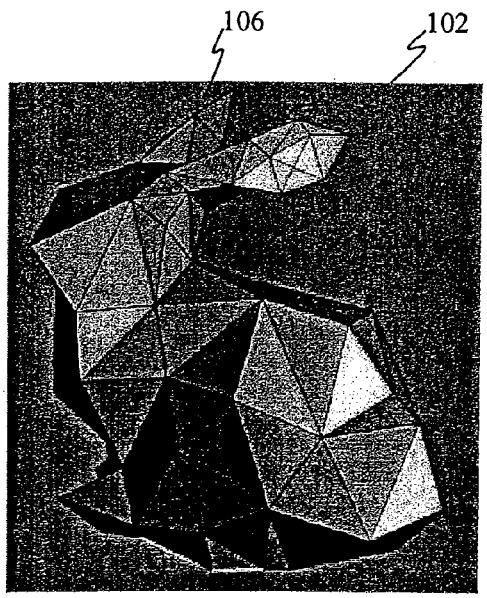
FIGS. 1A to 1C illustrate multiple level of detail representations of a modeled 3-dimensional object.
Figure 1B:
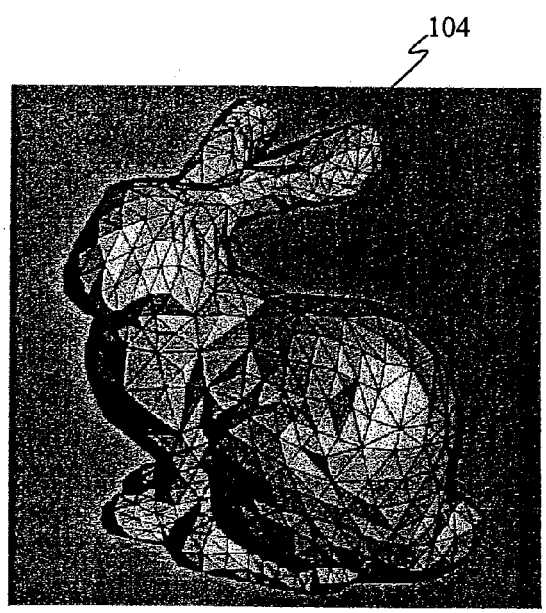
Figure 1C:
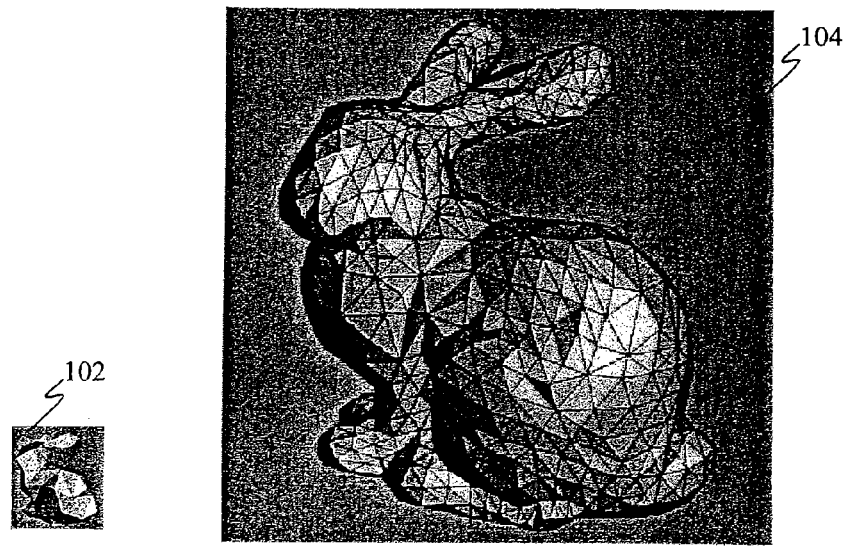
Figure 2:
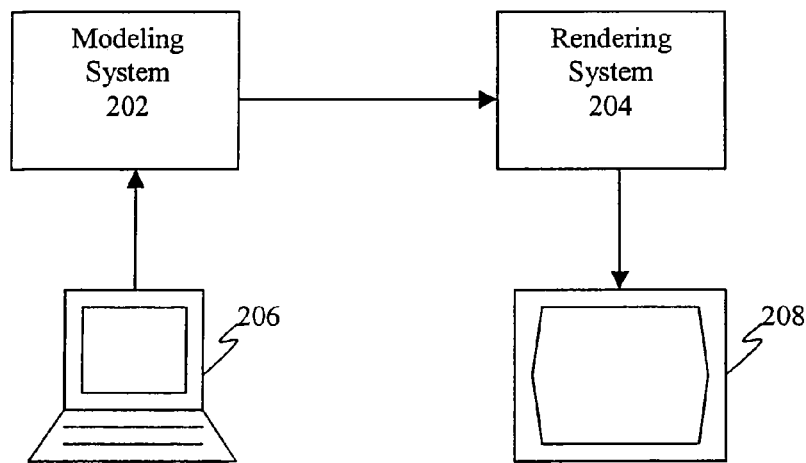
FIG. 2 is a top-level functional block diagram illustrating an example architecture of a computer graphics system that can be adapted for use in the present invention.

A top-level functional block diagram of an example implementation of the present invention is illustrated in FIG. 2.

As shown in FIG. 2, a computer graphics system includes a modeling/animation system 202 and rendering system 204. Although shown separately for clarity, modeling system 202 and rendering system 204 can be implemented as software that is commonly executed by a common processor. Alternatively, modeling system 202 and rendering system 202 are implemented as hardware or software components that are separately provided in different platforms and communicate with each other via a bus, a network, or other communication means, using interprocess schemes such as client-server communications, for example. It should be apparent that many alternative topologies and implementations are possible.

Generally, modeling/animation system 202 (e.g. Maya from Alias|Wavefront of Toronto, Ontario, Softimage|3D from Avid Technology, Inc. of Tewskbury, Mass. and 3D Studio Max from Discreet Logic, Inc. of Montreal, Quebec) allows a content creator/editor to model objects and specify how they are to be displayed in a scene (e.g. lighting, effects, material definitions) via GUI system 206. These models and instructions are sent by modeling system 202 to rendering system 204 to be displayed on a display 208 (which may be commonly or separately provided with GUI 206 system such as in a SGI Octane visual workstation, for example) or captured in an image file. In one example, particularly where autonomy between the modeling system 202 and rendering system 204 is desired, this transfer of graphics data and instructions is performed using an industry standard interface such as the RenderMan Interface (see, for example, the RenderMan Interface V3.1 description at www.pixar.com), or non-standard interfaces based thereon. In accordance with an aspect of the invention, modeling system 202 allows a content creator/editor to create and/or specify multiple LOD representations of a modeled object and rendering system 204 is adapted to select the appropriate representation from the specified representations and to provide smooth transitions between appropriate representations.

The present invention contemplates the use or adaptation of various modeling systems and ways of specifying multiple LOD object representations, and such are considered to be incidental to the invention. For example, modeling system 202 can specify various levels of detail of an object by providing separate representations of the object that have been tesselated with various numbers and/or sizes of geometric primitives (e.g. polygons such as triangles). In one possible implementation, this is done by declaring a range of detail for each representation using RiDetailRange in the RenderMan Interface. Alternatively, objects (or surfaces thereof) can be specified by programs and rendering system 204 itself can generate different tesselations of the object at various levels of detail based on object size algorithms, for example.

Figure 3:
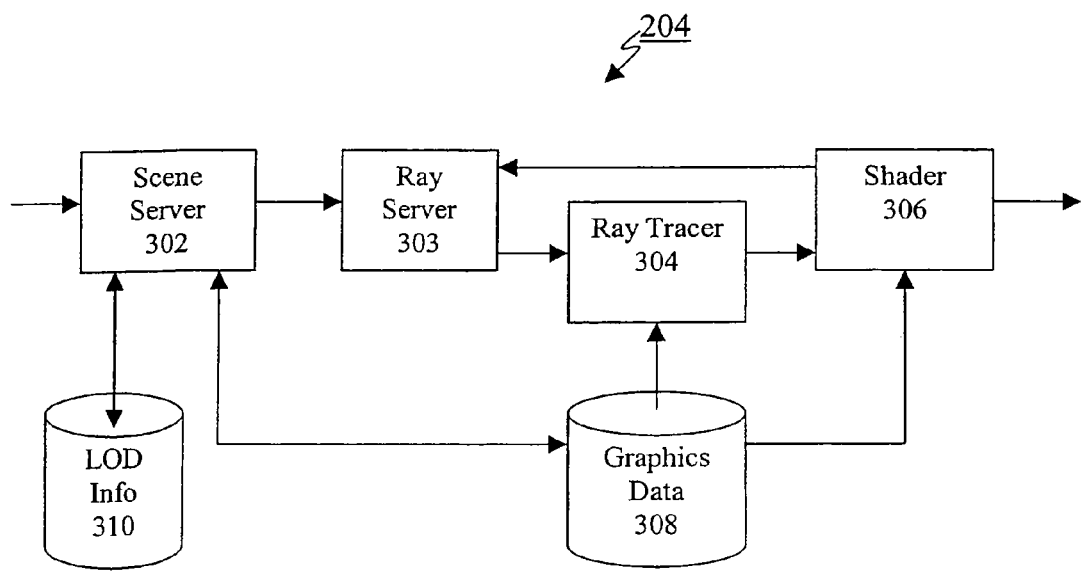
FIG. 3 is a functional block diagram of an example rendering system in accordance with the principles of the present invention.

FIG. 3 illustrates an example implementation of rendering system 204. As shown in FIG. 3, a rendering system 204 includes a scene server 302, a ray server 303, a ray tracer 304 and a shader 306. Scene server 302 receives a graphics input (e.g. a RenderMan Interface Bytestream (RIB)), and in response provides scene parameters to ray server 303 and establishes graphics data structures 308 (e.g. object descriptions, textures, surface shading programs, lights, etc.) for use by ray tracer 304 and shader 306. Of particular relevance to the present invention, as further shown in FIG. 3, scene server 302 extracts and maintains LOD information 310 concerning certain objects.

It should be apparent that many other components, stores and graphics data and instructions can be included or processed in the rendering system 204, but these will not be illustrated or described so as not to obscure the invention. Moreover, it should be noted that scene server 302, ray server 303, ray tracer 304 and shader 306 are shown and described separately for clarity of the invention. However, it should be apparent that these components and the functionality performed by each as described herein can be consolidated and/or divided among fewer or additional components, including scene server 302, ray server 303, ray tracer 304 and shader 306. In one example implementation, ray tracer 304 and shader 306 are implemented together as multiple ASICs in a distributed computing architecture in which scene server 302 and ray server 303, implemented as software executing on one or more processors, act as hosts to divide a scene into multiple partitions and provides graphics data and instructions to individual ray tracer and shader ASICs respectively assigned to the partitions. However, it should be apparent that many alternative implementations and topologies are possible.

Generally, in operation, scene server 302 extracts object data from the graphics input, updates and/or maintains the appropriate graphics data in store 308, and provides image resolution parameters and camera information to ray server 303. In one example implementation, for a given scene or frame to be rendered, scene server 302 determines the center of projection and window on the view plane (i.e. the camera or eye view) of the scene and provides this information to ray server 303. Ray server 303 then causes ray tracer 304 and shader 306 (or respectively assigned circuits thereof) to compute the color of each pixel in the window. For example, for a given pixel (or for each subpixel in a pixel), ray server 303 determines the camera ray from the center of projection through the pixel, and instructs ray tracer 304 to determine objects hit by the ray. For certain implementations, ray tracer 304 may further generate rays that are spawned from the original ray (e.g. reflections, refractions and shadows). Given the objects hit by or shadowed from the original and subsidiary rays, as computed by ray tracer 304, shader 306 computes the color contributed by each object for that pixel, and may further generate additional rays to be processed. Those skilled in the art will understand how to implement or adapt a shader 306 that computes colors given the output of a ray tracer and other shading information, and so an even further detailed description thereof is unnecessary for an understanding of the present invention.

In accordance with the level of detail aspects of the present invention, further processing is performed by scene server 302 and ray tracer 304. For example, when an object (or instance of the same object that appears multiple times) in the scene includes multiple levels of detail, scene server 302 determines the detail representation(s) of the object instance to use for the scene. This can be done in many ways. For example, scene server 302 can use a current detail level supplied in the graphics input and a detail range that is valid for each representation to determine the closest representation for the current level of detail. If it is determined that the current level of detail leads to a point between two representations of an object, the scene server can provide both representations to the ray tracer (via graphics data store 308), along with a weight to be applied to each representation. Alternatively, scene server 302 can, for each object instance having multiple levels of detail, automatically pick the two closest representations based on, for example, the projected size of the object instance in the scene, and the detail ranges specified for the representations. These representations are provided to the ray tracer (via graphics data store 308), along with a relative weight to be applied to each so as to provide a smooth transition between the two representations.

Figure 4:
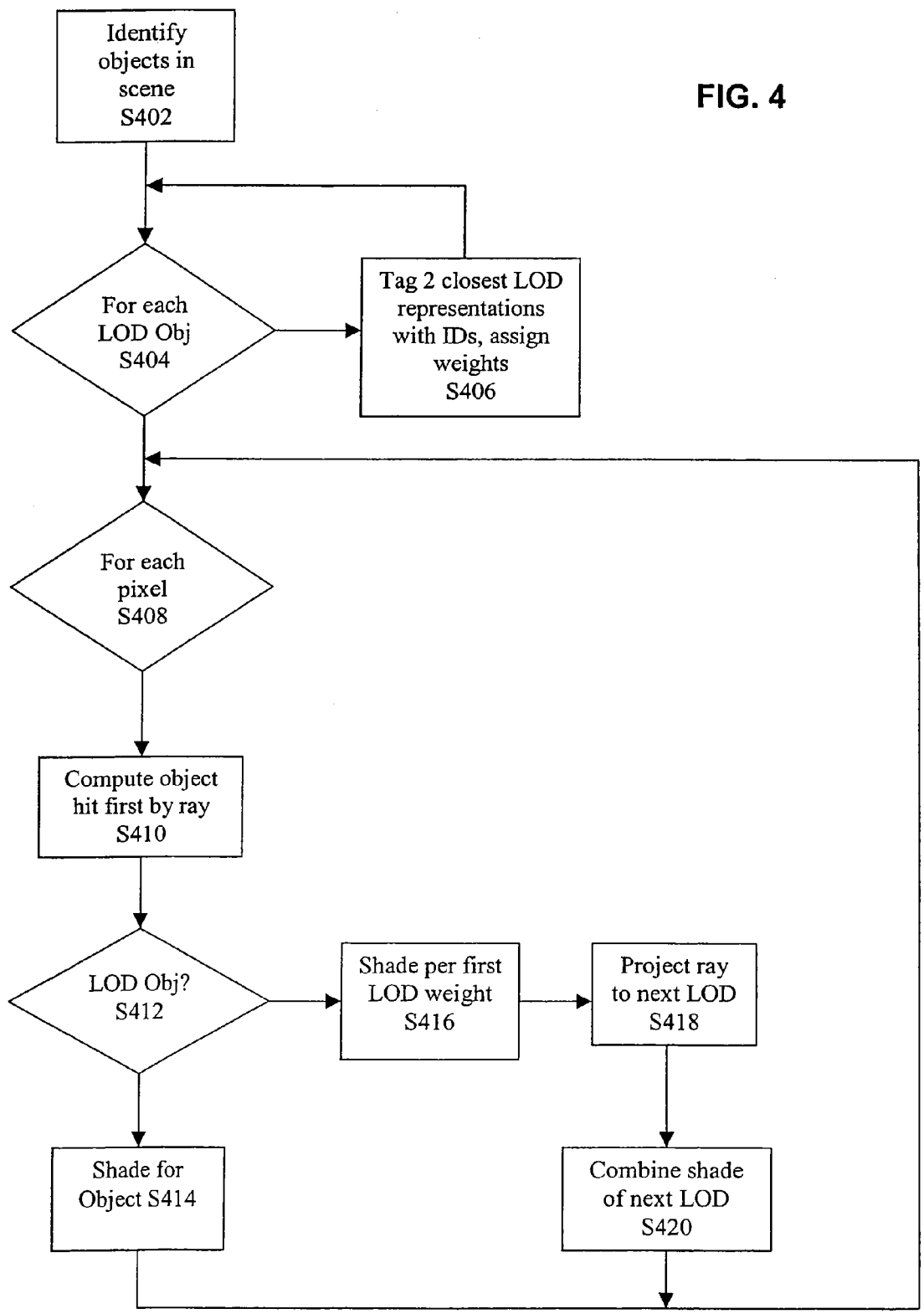
FIG. 4 is a flowchart illustrating an example level of detail method implemented in accordance with one embodiment of the present invention.

One example of a level of detail method implemented by rendering system 204 is illustrated in FIG. 4.

As shown in FIG. 4, given a set of objects and a current camera view for a scene, system 204 determines all the objects (including, perhaps, all of a plurality of instances of a single modeled object) that project onto the window of the view plane for the scene (S402). For each of the object instances that have multiple specified levels of detail (determined in step S404), system 204 determines two detail representations of the object instance that are the most appropriate for the scene, and tags them both with the same LOD ID. System 204 further assigns weights to be applied each respective representation in accordance with their relative appropriateness (S406). This may be done by interpolation and so that the values of the weights sum to 1, for example.

One possible implementation for selecting two LOD representations of an object instance for a scene will now be described, although the present invention is not limited thereto. In this implementation, a bounding box is associated with the object, located at the same position as the object. Also associated with the object are detail ranges for each level of detail representation of the object. These detail ranges correspond to the number of pixels to which the bounding box will project on the view plane (i.e. the perceived size of the object). System 204 converts these detail ranges to respective distances between the camera and the bounding box. Accordingly, system 204 will maintain camera distances for each level of detail representation. Thus, when an LOD object appears in the scene, system 204 determines the current distance between the object in the scene (or, preferably, the bounding box associated with the object) and the current camera position and compares the current distance between the distances stored for each LOD representation. Generally, the current distance will fall between two of the stored distances. System 204 will then select the LOD representations corresponding to the two stored distances for use in the scene. System 204 then assigns weights using, for example, straight line interpolation between the two stored distances with respect to their closeness to the computed distance. Accordingly, if the current distance falls exactly in the middle between two stored distances, each representation corresponding to the stored distances will be assigned a weight of 0.5. If the computed current distance falls closer to one of the stored distances, the representation (i.e. the "appropriate" representation) corresponding to that stored distance will be assigned a weight greater than 0.5, while the other representation (i.e. the "alternative" representation) is assigned a weight less than 0.5.

It should be noted that there are many alternative embodiments to the above-described implementation. For example, values other than number of pixels may be associated with each other LOD representation, and the system 204 will be adapted to compare these specified values with current values for an object in accordance with the current scene. Moreover, even where the detail ranges are specified in number of pixels, system 204 need not convert these to respective distances but instead may project the current bounding box to the view plane and determine the appropriate representation by direct comparison to the specified detail ranges. Still further, a content creator may specify that certain representations are weighted greater than others, or greater or less than non-LOD objects. This may be accounted for by having weights that sum to values less than or greater to 1. Finally, it should be apparent that, particularly where a highest and lowest specified LOD representation is specified above or below a certain threshold, respectively, system 204 may determine that only one LOD representation among several representations is used for the current scene (which may be flagged by setting its LOD ID to 0). Likewise, where a current computed distance falls almost exactly on a stored distance, the most appropriate LOD representation corresponding to that distance may be selected, and both the next highest and lowest LOD representations may be selected for use in the subsequent processing steps, rather than just two LOD representations.

Ray tracing is then performed for each pixel (and, perhaps, for each subpixel thereof) in the window of the view plane for the scene. At each pixel, the ray from the center of projection through the pixel is computed (S408). Next, the first object instance hit by the ray is determined (S410). If the object instance hit by the ray is not an LOD object (determined in step S412 by checking whether the LOD ID is nonzero, for example), the color for that pixel is determined based on the point of intersection of the ray with the object, along with other shading information that might be associated with the object (S414). If the first object instance hit by the ray is one of the LOD representations of an object, special processing is performed in accordance with the invention. First, the color (and perhaps opacity) for the point of intersection with the first LOD representation is determined and then multiplied by the weight assigned to that representation (S416). Next, the ray is projected further into the scene to determine the point of intersection with the next LOD representation of the object (S418), if any, for example by locating the object with the same LOD ID and extrapolating a point of intersection from the projected ray. The shade for the point of intersection with the next LOD representation is also determined and multiplied by its associated weight. The weighted shade for the next LOD representation is then combined with the weighted shade for the first LOD representation to arrive at the final shade for that pixel (S420).

Although in this example, two different LOD representations of a modeled object are used, the invention is not so limited. For example, in an alternative embodiment, more than two or just one representation is used. This can be done consistently by assigning appropriate weights to the various representations. For example, when only one representation is used, its weight can be set to 1 while the other weight is set to 0. Moreover, where three or more representations are used, the sum of the weights for the selected representations may still total to one, with a normal distribution between various representations centered around the most appropriate representation (e.g. 0.5 for the most appropriate, and 0.25 for two alternative representations).

Meanwhile, it should be noted that certain of the steps described above need not be completed sequentially. For example, system 204 may be configured for parallel ray processing. Thus, it may be possible for shading processing for one ray may be completed while tracing processing for other rays (perhaps, even its child or sibling rays) is performed. Other alternative ordering and scheduling of steps should be apparent to those skilled in the art.

In a further alternative embodiment, the principles of the present invention are applied to graphics systems using recursive ray tracing techniques. This aspect of the invention is illustrated in FIGS. 5A and 5B.

As shown in FIG. 5A, if a camera ray (or, alternatively, a reflected or refracted ray) hits an object that has multiple LOD representations, a ray tree is generated for the first representation of the object that is struck by the ray. In the illustrated example, original ray first strikes semi-transparent object 502 at a point of intersection P1 having an associated surface normal N1. A refracted ray T1 and a reflected ray R1 are spawned from this point of intersection. Refracted ray R1 continues through object 502 hitting a rear surface thereof at point of intersection P2. A refracted ray T2 and reflected ray R2 are generated from this point. Reflected ray R1 projects into the scene until it hits opaque object 504 at a point of intersection P3 having an associated surface normal N3. A reflected ray R3 is spawned from P3.

In this example, object 502 is a LOD object having an associated alternate (i.e. less detailed) LOD representation 502'. In accordance with an aspect of the invention, therefore, a sibling ray tree is further generated. The sibling ray begins with an origin at the point of intersection P1 between the original ray and the first LOD object (rather than from the point of origin of the ray that struck object 502). Its ray direction is the same as the original ray.

Similar ray tracing processing is performed with the sibling ray as with the original ray. However, the ray tracing processing for the sibling ray is constrained to avoid any intersections with the original LOD object representation 502, i.e. this ray (and any child rays spawned from it) can intersect the alternate LOD object representation 502' or any other object, but not object representation 502.

Accordingly, as shown in FIG. 5B, the sibling ray is projected into the scene along the original direction until it strikes alternate LOD object representation 502' at point of intersection P1'. Child refracted and reflected rays T1', T2', R1', R2' and R3' are generated similarly as above using recursive ray tracing. It should be apparent that, although the same objects and numbers of child rays are shown in FIG. 5B as in FIG. 5A, that fewer or additional objects and child rays may be included in the ray tree for the sibling ray because of differences in geometry between the first and alternate representations of the LOD object, for example. It should be further apparent that similar techniques can be duplicated and/or applied for implementations using more than two representations of an LOD object.

Using shading techniques, the color associated with the original ray by traversing the original ray tree is determined and multiplied by the weight associated with the original LOD object. Next, the color associated with the sibling ray by traversing the sibling ray tree is determined and multiplied by the weight associated with the alternate LOD object. These colors are combined to arrive at a blended color associated with the original ray. If the original ray was associated with the camera ray, processing has been completed and the color for the pixel associated with the camera ray has been determined. Otherwise, if the original ray was a reflected or refracted ray, further processing may be needed to arrive at the final color for the pixel associated with a parent camera ray.

Figure 6:
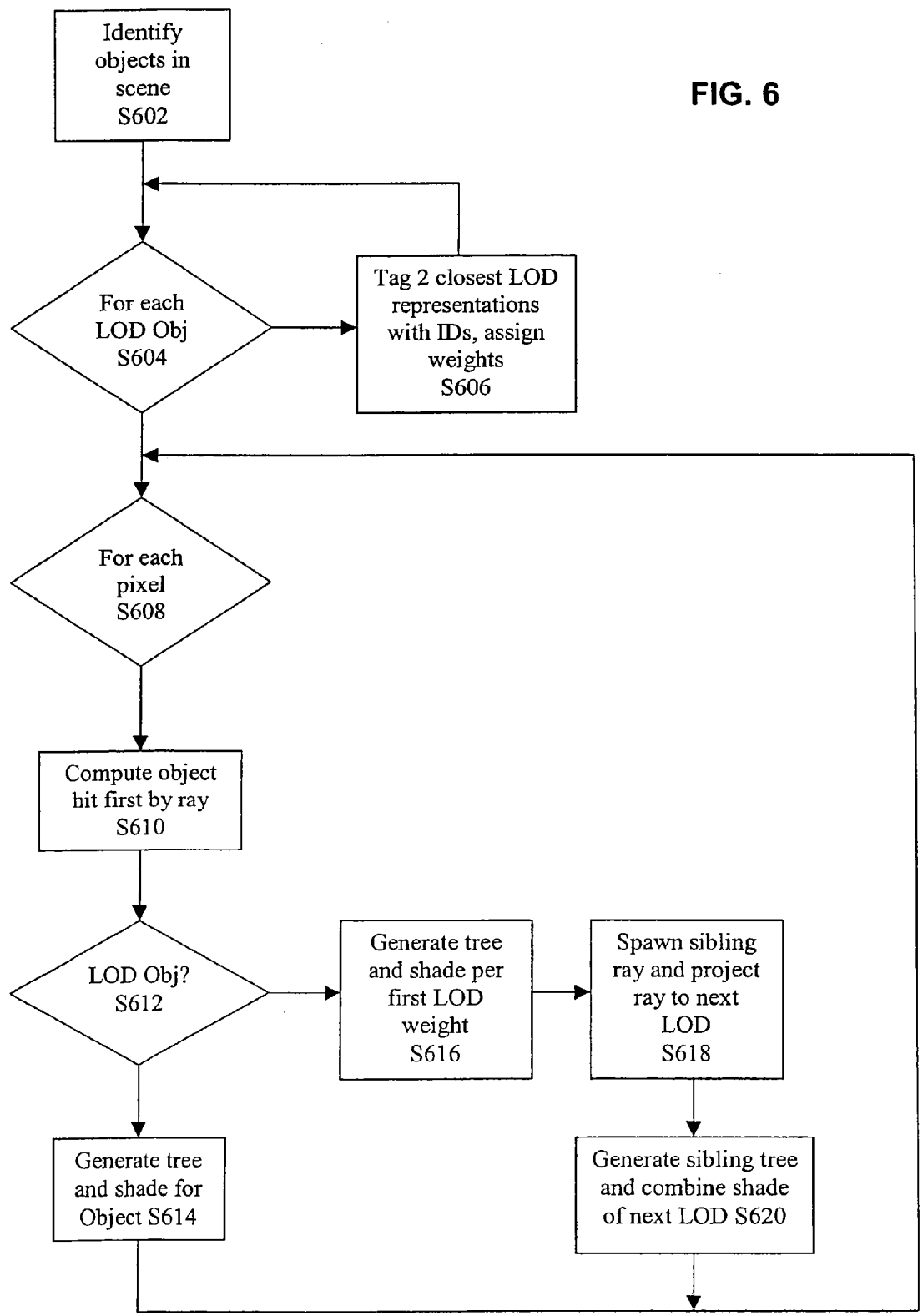
FIG. 6 is a flow chart illustrating an example level of detail method implemented in accordance with another embodiment of the present invention.

An alternate level of detail method implemented by rendering system 204 in accordance with the above-described alternate embodiment is illustrated in FIG. 6.

As shown in FIG. 6, and similarly as in the previous example, given a set of objects and a current camera view for a scene, system 204 determines all the objects (and, perhaps, all instances of the same modeled object) that project onto the window of the view plane for the scene (S602). For each of the object instances that have multiple specified levels of detail (determined in step S604), system 204 determines the two detail representations of the object instance that are the most appropriate for the scene, and tags them both with the same LOD ID. This may be done in a variety of ways as discussed above. System 204 further assigns weights to be applied each respective representation in accordance with their relative appropriateness (S606). This may be done by interpolation and so that the total of the weights sum to 1, for example, and using any of the techniques described above.

Recursive ray tracing is then performed for each pixel in the window of the view plane for the scene. At each pixel (and, perhaps, each subpixel thereof), the ray from the center of projection through the pixel is computed (S608). Next, the first object instance hit by the ray is determined (S610). If the object hit by the ray is not an LOD object (determined in step S612), a ray tree is generated from the point of intersection with that object and the color for that pixel is determined by traversing the ray tree generated from that point of intersection (S614). If the first object instance hit by the ray is one of the LOD representations of an object, special processing is performed in accordance with this alternative embodiment of the invention. First, a first ray tree is generated from the point of intersection with the ray and the first LOD representation of the object. Shading techniques are performed by traversing this ray tree to determine the color associated therewith and then this color is multiplied by the weight assigned to that representation (S616). Next, the sibling ray is projected from the point of intersection further into the scene to determine the point of intersection with the next LOD representation of the object (S618), for example by searching for another object having the same LOD ID as the first representation. A sibling ray tree is generated from the point of intersection of the sibling ray with the next LOD representation. Shading techniques are performed to determine the color associated with the sibling ray by traversing the sibling ray tree, and this result is multiplied by the weight associated with the alternate LOD object. The weighted shade for the next LOD representation is then combined with the weighted shade for the first LOD representation to arrive at the final shade for that pixel (S620).

It should be noted that this alternative embodiment is not constrained to generating sibling rays and sibling ray trees from only camera rays. Rather, one skilled in the art will understand how this embodiment can be applied to situations where the ray that hits a LOD object is a child ray such as a refracted or reflected ray. Furthermore, as discussed above, it should be noted that certain or all of the above ray processing may be performed in parallel and not necessarily sequentially in the order illustrated in FIG. 6. Still further, it should be apparent that certain types of rays can be excluded from the above-described processing for LOD objects while others included—the invention is not limited to LOD processing for all types of rays.

Figure 7B:
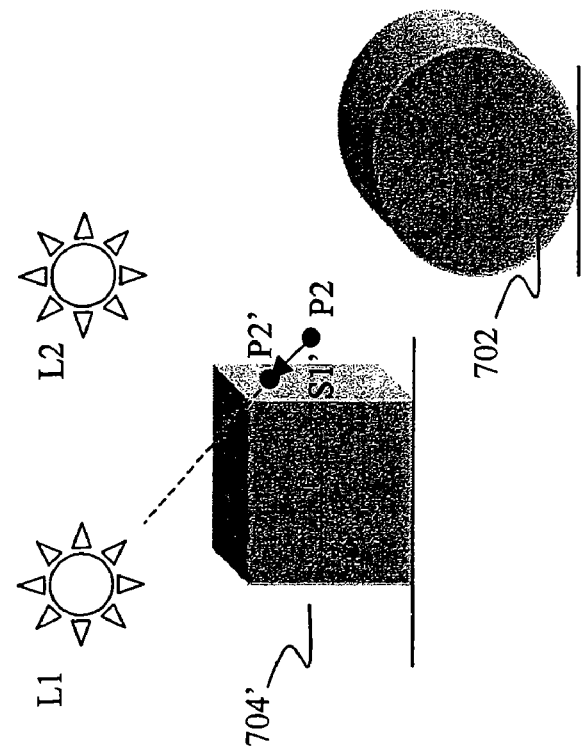
FIGS. 7A and 7B illustrate an example of shadow ray tracing performed in accordance with another embodiment of the present invention.
Figure 7A:
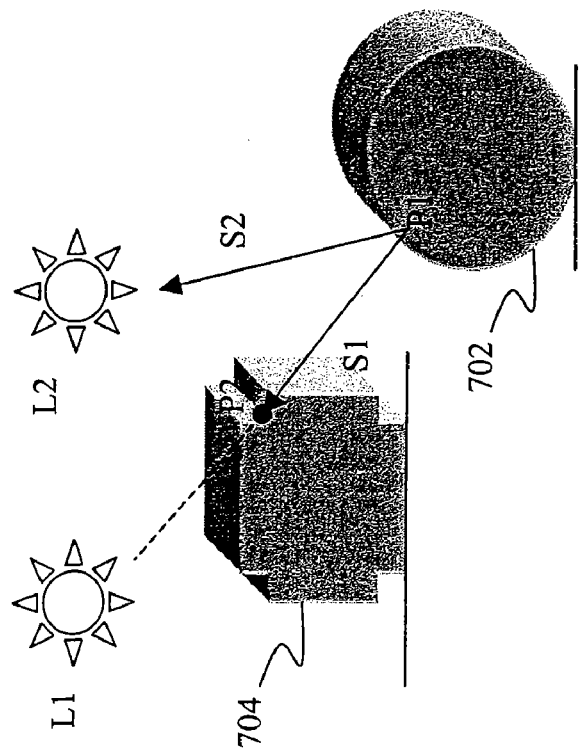

The principles of the present invention can be even further applied to additional ray tracing techniques, such as handling of shadow rays. FIGS. 7A and 7B illustrate an example of rendering system 204 level of detail functionality according to a further embodiment of the present invention in which shadow rays are considered.

As is known, shadow rays are spawned from a point of intersection of an original ray with an object to every light source defined for that object. Shadow rays require a different solution when handling LOD objects since shadow ray trees are not created as in the above recursive ray tracing discussion. As illustrated in FIG. 7A, shadow rays S1 and S2 are generated from a point of intersection P1 on object 702 toward light sources L1 and L2. As further shown, shadow ray S1 strikes object 704 at point P2. If object 704 in the path of shadow ray S1 is a fully opaque LOD object, or if it is a transparent LOD object and the opacity indicates that the object is fully opaque, the shadow ray S1 is considered in shadow and no further processing is performed.

If, however, object 704 is a transparent or semi-transparent LOD object, then a sibling shadow ray will be spawned, which sibling shadow ray starts at point of intersection P2 and has the same ray direction as the original shadow ray. The sibling shadow ray cannot intersect the same LOD object but can intersect another object or the alternate LOD.

Accordingly, as shown in FIG. 7B, sibling shadow ray S1' starts at point P2 and strikes alternate LOD representation 704' at point P2'. The sibling shadow ray is processed and the results combined with the results for the original shadow ray. Specifically, the opacities at the respective points of intersection P2, P2' for each representation 704, 704' are determined. The LOD weights associated with each LOD representation are then used to blend the two opacities, to determine the overall opacity at the point of intersection P2. If the sibling shadow ray does not intersect the alternate LOD then the weight associated with it is 0. If the overall opacity indicates fully opaque, processing for the shadow ray is stopped, otherwise the shadow ray is projected further toward the light source to determine whether any other objects lie in that path.

Figure 8:
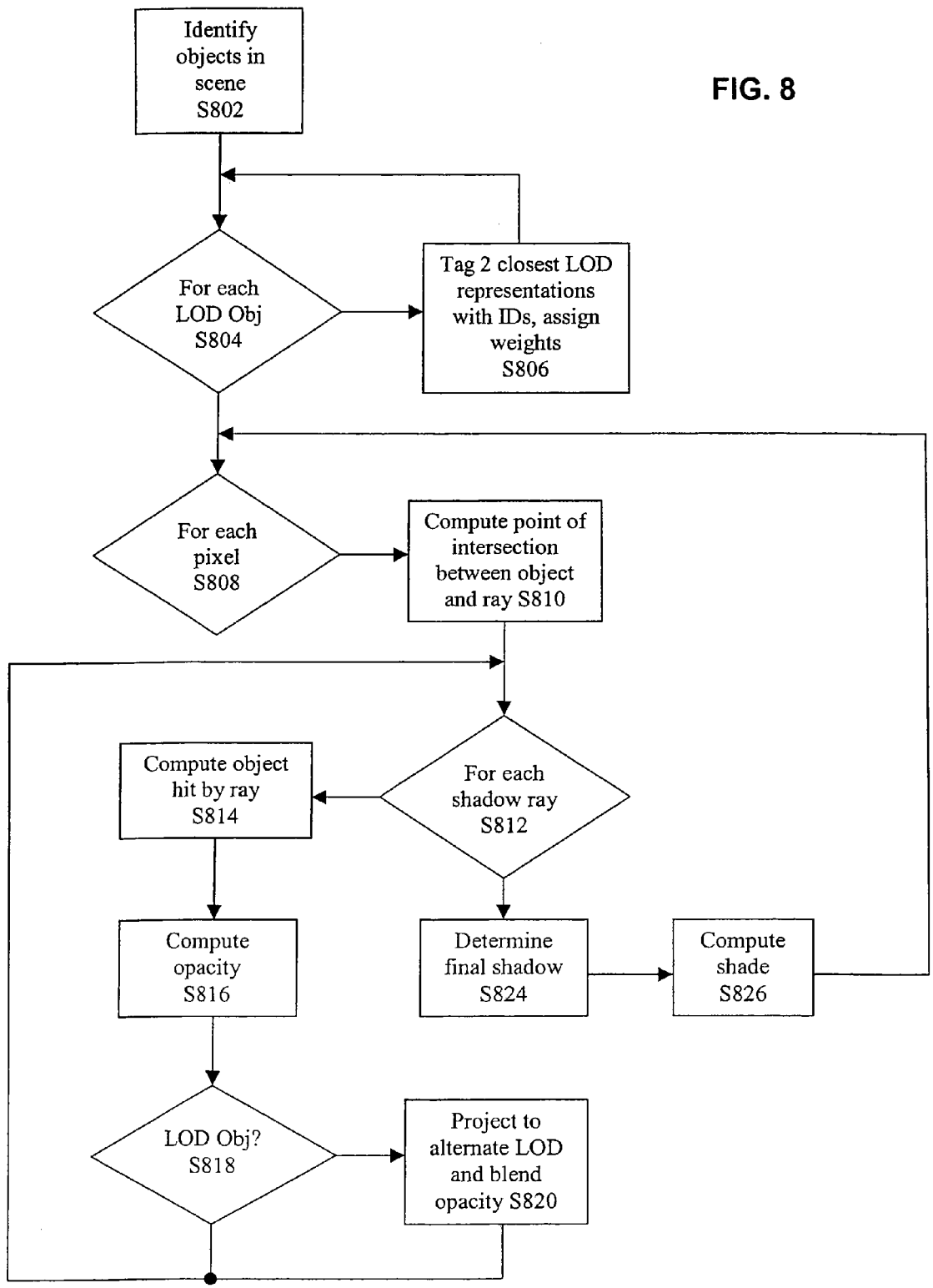
FIG. 8 is a flowchart illustrating an example level of detail method implemented in accordance with another embodiment of the present invention.

FIG. 8 is a flowchart illustrating an example method of handling level of detail during shadow ray tracing according to this embodiment of the present invention.

As shown in FIG. 8, and similarly as in the previous examples, given a set of objects and a current camera view for a scene, system 204 determines all the objects (and, perhaps, all instances of the same modeled object) that project onto the window of the view plane for the scene (S802). For each of the object instances that have multiple specified levels of detail (determined in step S804), system 204 determines the two detail representations of the object instance that are the most appropriate for the scene, and tags them both with the same LOD ID. System 204 further assigns weights to be applied each respective representation in accordance with their relative appropriateness (S806). This may be done by interpolation and so that the total of the weights sum to 1, for example, and using techniques described above.

Ray tracing is then performed for each pixel in the window of the view plane for the scene. At each pixel (and, perhaps, each subpixel thereof), the ray from the center of projection through the pixel is computed (S808). Next, the point of intersection with the object instance hit by the ray is determined (S810). It should be noted that in a non-recursive ray tracing implementation, only one object hit by the camera ray is examined. However, in recursive ray tracing implementations, for example, the object examined in step S810 may be hit by a secondary ray such as a reflected ray or refracted ray. A shadow ray is spawned from the point of intersection to each light source associated with the object. Each shadow ray is processed to determine the amount of shadow associated with each light source (S812). First, it is determined if the shadow ray hits an object, and if so, the point of intersection is determined (S814). The opacity of the stricken object at the point of intersection is then determined (S816). It should be noted that if the shadow ray does not strike an object, there will be no shadow associated with the ray.

If, however, the shadow ray strikes an object, and the object hit by the ray is an LOD object (determined in step S818), special processing is performed in accordance with this alternative embodiment of the invention. First, a sibling shadow ray is generated from the point of intersection with the original shadow ray and the first LOD representation of the object. The sibling ray is projected until it strikes the alternate LOD representation (e.g. by searching for another object having the same LOD ID). The opacity at the point of intersection of the sibling ray with the alternate LOD representation is determined and multiplied by the weight assigned to that representation. Next, the opacity determined for the point of intersection of the original shadow ray with the first LOD representation determined in step S816 is multiplied by the weight assigned to that representation. The two weighted opacities are then combined to form a blended final opacity associated with the LOD object (S820). It should be noted that if the sibling ray does not strike the alternate LOD representation, then the opacity for the original shadow ray can simply be used. It should be further noted that steps S814-S820 can be repeated as the shadow ray strikes other objects as it is projected further toward the light source, unless a completely opaque object is encountered.

After all shadow rays from the original point of intersection have been processed (determined in step S812), the final shadow value is determined (S824) and the color/opacity for the pixel based thereon is determined (S826) in accordance with shading techniques.

In this embodiment, although some parallel processing is possible as described previously, it is preferred that processing for all shadow rays associated with a point of intersection be completed before advancing further, given that shadow ray trees are not generated.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications. It is noted, for example, that the above described embodiments of the invention are not necessarily mutually exclusive and that level of detail processing may be applied selectively and variously to graphics systems employing any combination of ray tracing techniques such as forward ray tracing, backward ray tracing including shadow rays, and forward and backward ray tracing not including shadow rays. Such various combinations are considered still further embodiments of the present invention by the present inventors, and such should be apparent to those skilled in the art.

What is claimed is:

1. A method comprising:
assigning a first weight to a first level of detail (LOD) representation of an object, and assigning a second weight to a second LOD representation of the object, wherein the first and second weights are based on the object's perceived size in a camera view of a scene;
using one or more processors to generate a ray-tracing result based on (i) a first ray-tracing result for the first LOD representation of the object and the first weight and (ii) a second ray-tracing result for the second LOD representation of the object and the second weight; and
generating a digital image based on the ray-tracing result.

2. The method of claim 1 wherein the first and second LOD representations are two separate LOD representations selected from a plurality of LOD representations of the object.

3. The method of claim 2 wherein the first and second LOD representations are selected based on the projected size of the object in the camera view of the scene.

4. The method of claim 2 wherein the first and second LOD representations correspond to upper and lower boundaries of a detail range defined by the number of pixels that would be required to display the object in the scene.

5. The method of claim 1 wherein the first and second weights assigned to the first and second LOD representations sum to one.

6. The method of claim 1 wherein generating a ray-tracing result comprises:

projecting a ray into the camera view of the scene;
determining an intersection point where the ray intersects the first LOD representation and the second LOD representation;
determining a first weighted color and/or opacity by determining a first color and/or opacity at the intersection point for the first LOD representation, and multiplying the first color and/or opacity by the first weight;
determining a second weighted color and/or opacity by determining a second color and/or opacity at the intersection point for the second LOD representation, and multiplying the second color and/or opacity by the second weight;
combining the first weighted color and/or opacity and the second weighted color and/or opacity to determine the color and/or opacity at the intersection point.

7. The method of claim 1 wherein generating a ray-tracing result comprises:
projecting a ray into the camera view of the scene;
determining a first intersection point where the ray intersects the first LOD representation;
determining a first weighted color and/or opacity by determining a first color and/or opacity for the first intersection point, and multiplying the first color and/or opacity by the first weight;
determining a second intersection point where the ray intersects the second LOD representation;
determining a second weighted color and/or opacity by determining a second color and/or opacity for the second intersection point, and multiplying the second color and/or opacity by the second weight;
combining the first weighted color and/or opacity and the second weighted color and/or opacity to determine the color and/or opacity for a pixel corresponding to the first and second intersection points.

8. The method of claim 1 wherein generating a ray-tracing result comprises:
projecting an original ray into the camera view of the scene;
generating a ray tree at a first intersection point where the original ray intersects the first LOD representation;
generating a sibling ray from the first intersection point in the same direction as the original ray;
generating a sibling ray tree at a second intersection point where the sibling ray intersects the second LOD representation;
determining a first weighted color based on the original ray tree and the first weight;
determining a second weighted color based on the sibling ray tree and the second weight;
combining the first weighted color and the second weighted color to determine the color for a pixel corresponding to the first and second intersection points.

9. The method of claim 8 wherein rays associated with the sibling ray tree which intersect the first LOD representation are excluded from the step of determining a second weighted color based on the sibling ray tree.

10. The method of claim 8 wherein the ray tree and the sibling ray tree include reflected rays, refracted rays, and shadow rays.

11. The method of claim 1 wherein generating a ray-tracing result comprises:
projecting a ray into the camera view of the scene;
determining a first intersection point where the ray intersects a second object;
generating an original shadow ray at the first intersection point toward a light source;
determining a second intersection point where the original shadow ray intersects the first LOD representation;
if the first LOD representation is opaque, then generating the ray-tracing result based on the original shadow ray;
if the first LOD representation is not opaque, then
(i) determining a first weighted opacity by determining a first opacity at the second intersection point, and multiplying the first opacity by the first weight;
(ii) generating a sibling ray from the second intersection point in the same direction as the original shadow ray;
(iii) determining a third intersection point where the sibling shadow ray intersects the second LOD representation;
(iv) determining a second weighted opacity by determining a second opacity at the third intersection point, and multiplying the second opacity by the second weight; and
(v) generating the ray-tracing result based on the combination of the first weighted opacity and the second weighted opacity.

12. The method of claim 11 wherein the sibling shadow ray ignores any intersection point where the sibling ray intersects the first LOD representation other than at the second intersection point.

13. An apparatus comprising:
a modeling means for assigning a first weight to a first level of detail (LOD) representation of an object, and assigning a second weight to a second LOD representation of the object, wherein the first and second weights are based on the object's perceived size in a camera view of a scene;
a rendering means for (i) generating a ray-tracing result based on (a) a first ray-tracing result for the first LOD representation of the object and the first weight and (b) a second ray-tracing result for the second LOD representation of the object and the second weight; and (ii) generating a digital image based on the ray-tracing result.

14. The apparatus of claim 13 wherein the first and second LOD representations are two separate LOD representations selected from a plurality of LOD representations of the object.

15. The apparatus of claim 14 wherein the first and second LOD representations are selected based on the projected size of the object in the camera view of the scene.

16. The apparatus of claim 14 wherein the first and second LOD representations correspond to upper and lower boundaries of a detail range defined by the number of pixels that would be required to display the object in the scene.

17. The apparatus of claim 13 wherein the first and second weights assigned to the first and second LOD representations sum to one.

18. The apparatus of claim 13 wherein the rendering means performs the steps of (i) projecting a ray into the camera view of the scene; (ii) determining an intersection point where the ray intersects the first LOD representation and the second LOD representation; (iii) determining a first weighted color and/or opacity by determining a first color and/or opacity at the intersection point for the first LOD representation, and multiplying the first color and/or opacity by the first weight; (iv) determining a second weighted color and/or opacity by determining a second color and/or opacity at the intersection point for the second LOD representation, and multiplying the second color and/or opacity by the second weight; and (v) combining the first weighted color and/or opacity and the second weighted color and/or opacity to determine the color and/or opacity at the intersection point.

19. The apparatus of claim 13 wherein the rendering means performs the steps of (i) projecting a ray into the camera view of the scene; (ii) determining a first intersection point where the ray intersects the first LOD representation; (iii) determining a first weighted color and/or opacity by determining a first color and/or opacity for the first intersection point, and multiplying the first color and/or opacity by the first weight;

(iv) determining a second intersection point where the ray intersects the second LOD representation; (v) determining a second weighted color and/or opacity by determining a second color and/or opacity for the second intersection point, and multiplying the second color and/or opacity by the second weight; and (vi) combining the first weighted color and/or opacity and the second weighted color and/or opacity to determine the color and/or opacity for a pixel corresponding to the first and second intersection points.

20. The apparatus of claim 13 wherein rendering means performs the steps of: (i) projecting an original ray into the camera view of the scene; (ii) generating a ray tree at a first intersection point where the original ray intersects the first LOD representation; (iii) generating a sibling ray from the first intersection point in the same direction as the original ray; (iv) generating a sibling ray tree at a second intersection point where the sibling ray intersects the second LOD representation; (v) determining a first weighted color based on the original ray tree and the first weight; (vi) determining a second weighted color based on the sibling ray tree and the second weight; and (vii) combining the first weighted color and the second weighted color to determine the color for a pixel corresponding to the first and second intersection points.

21. The apparatus of claim 20 wherein the rendering means excludes rays associated with the sibling ray tree which intersect the first LOD representation from the determination of a second weighted color based on the sibling ray tree.

22. The apparatus of claim 20 wherein the ray tree and the sibling ray tree include reflected rays, refracted rays, and shadow rays.

23. The apparatus of claim 13 wherein the rendering means performs the steps of (i) projecting a ray into the camera view of the scene; (ii) determining a first intersection point where the ray intersects a second object; (iii) generating an original shadow ray at the first intersection point toward a light source; (iv) determining a second intersection point where the original shadow ray intersects the first LOD representation; and (v) if the first LOD representation is opaque, then generating the ray-tracing result based on the original shadow ray; but (vi) if the first LOD representation is not opaque, then (a) determining a first weighted opacity by determining a first opacity at the second intersection point, and multiplying the first opacity by the first weight; (b) generating a sibling ray from the second intersection point in the same direction as the original shadow ray; (c) determining a third intersection point where the sibling shadow ray intersects the second LOD representation; (d) determining a second weighted opacity by determining a second opacity at the third intersection point, and multiplying the second opacity by the second weight; and (e) generating the ray-tracing result based on the combination of the first weighted opacity and the second weighted opacity.

24. The apparatus of claim 23 wherein for generating the sibling ray, the rendering means ignores any intersection point where the sibling ray intersects the first LOD representation other than at the second intersection point.

25. An apparatus comprising:
a modeling system configured to assign a first weight to a first level of detail (LOD) representation of an object, and to assign a second weight to a second LOD representation of the object, wherein the first and second weights are based on the object's perceived size in a camera view of a scene;
a rendering system configured to generate a ray-tracing result based on (a) a first ray-tracing result for the first LOD representation of the object and the first weight and (b) a second ray-tracing result for the second LOD representation of the object and the second weight; and wherein the rendering system is further configured to generate a digital image based on the ray-tracing result.

26. The apparatus of claim 25 wherein the first and second LOD representations are two separate LOD representations selected from a plurality of LOD representations of the object.

27. The apparatus of claim 26 wherein the first and second LOD representations are selected based on the projected size of the object in the camera view of the scene.

28. The apparatus of claim 26 wherein the first and second LOD representations correspond to upper and lower boundaries of a detail range defined by the number of pixels that would be required to display the object in the scene.

29. The apparatus of claim 25 wherein the first and second weights assigned to the first and second LOD representations sum to one.

30. The apparatus of claim 25 wherein the rendering system comprises a ray tracer and a shader, wherein
the ray tracer is configured to project a ray into the camera view of the scene, and to determine an intersection point where the ray intersects the first LOD representation and the second LOD representation; and
the shader is configured to determine a first weighted color and/or opacity by determining a first color and/or opacity at the intersection point for the first LOD representation, and multiplying the first color and/or opacity by the first weight, wherein the shader is configured to determine a second weighted color and/or opacity by determining a second color and/or opacity at the intersection point for the second LOD representation, and multiplying the second color and/or opacity by the second weight, and wherein the shader is configured to determine the color and/or opacity at the intersection point by combining the first weighted color and/or opacity and the second weighted color and/or opacity.

31. The apparatus of claim 25 wherein the rendering system comprises a ray tracer and a shader, wherein
the ray tracer is configured to project a ray into the camera view of the scene, to determine a first intersection point where the ray intersects the first LOD representation, and to determine a second intersection point where the ray intersects the second LOD representation; and
the shader is configured to determine a first weighted color and/or opacity by determining a first color and/or opacity for the first intersection point, and multiplying the first color and/or opacity by the first weight, wherein the shader is configured to determine a second weighted color and/or opacity by determining a second color and/or opacity for the second intersection point, and multiplying the second color and/or opacity by the second weight, and and wherein the shader is configured to determine the color and/or opacity for a pixel corresponding to the first and second intersection points by combining the first weighted color and/or opacity and the second weighted color and/or opacity.

32. The apparatus of claim 25 wherein the rendering system comprises a ray tracer and a shader, wherein
the ray tracer is configured to project an original ray into the camera view of the scene, to generate a ray tree at a first intersection point where the original ray intersects the first LOD representation, to generate a sibling ray from the first intersection point in the same direction as the original ray, and to generate a sibling ray tree at a second intersection point where the sibling ray intersects the second LOD representation; and
the shader is configured to determine a first weighted color based on the original ray tree and the first weight, wherein the shader is configured to determine a second weighted color based on the sibling ray tree and the second weight; and wherein the shader is configured to determine the color for a pixel corresponding to the first and second intersection points by combining the first weighted color and the second weighted color.

33. The apparatus of claim 32 wherein the shader is configured to exclude rays associated with the sibling ray tree which intersect the first LOD representation from the determination of a second weighted color based on the sibling ray tree.

34. The apparatus of claim 32 wherein the ray tree and the sibling ray tree include reflected rays, refracted rays, and shadow rays.

35. The apparatus of claim 25 wherein the rendering system comprises a ray tracer and a shader, wherein
the ray tracer is configured to project a ray into the camera view of the scene, to generate a first intersection point where the ray intersects a second object, to generate an original shadow ray at the first intersection point toward a light source, and to generate a second intersection point where the original shadow ray intersects the first LOD representation, and
(i) if the first LOD representation is opaque, then the shader is configured to determine the color of the pixel at the first intersection point based on the original shadow ray; and
(ii) if the first LOD representation is not opaque, then
the ray tracer is configured to generate a sibling ray from the second intersection point in the same direction as the original shadow ray, and to determine a third intersection point where the sibling shadow ray intersects the second LOD representation; and
the shader is configured to determine a first weighted opacity by determining a first opacity at the second intersection point, and multiplying the first opacity by the first weight, the shader is configured to determine a second weighted opacity by determining a second opacity at the third intersection point, and multiplying the second opacity by the second weight; and the shader is configured to determine the color of the pixel at the first intersection point based on the combination of the first weighted opacity and the second weighted opacity.

36. The apparatus of claim 35 wherein for generating the sibling ray, the ray tracer is configured to ignore any intersection point where the sibling ray intersects the first LOD representation other than at the second intersection point.

* * * * *

UNITED STATES PATENT AND TRADEMARK OFFICE
CERTIFICATE OF CORRECTION

| | | |
|---|---|---|
| PATENT NO. | : 7,791,602 B2 | Page 1 of 1 |
| APPLICATION NO. | : 11/464435 | |
| DATED | : September 7, 2010 | |
| INVENTOR(S) | : Aaftab A. Munshi and Mark Wood-Patrick | |

It is certified that error appears in the above-identified patent and that said Letters Patent is hereby corrected as shown below:

In the Claims:

In claim 31, delete the second occurrence of the word "and" at column 14, line 63.

Signed and Sealed this
Twenty-eighth Day of December, 2010

David J. Kappos
*Director of the United States Patent and Trademark Office*